INVENTORS
ROBERT R. LEAMING
WILLIAM W. COFFEEN
BY Robert C. Sullivan
ATTORNEY

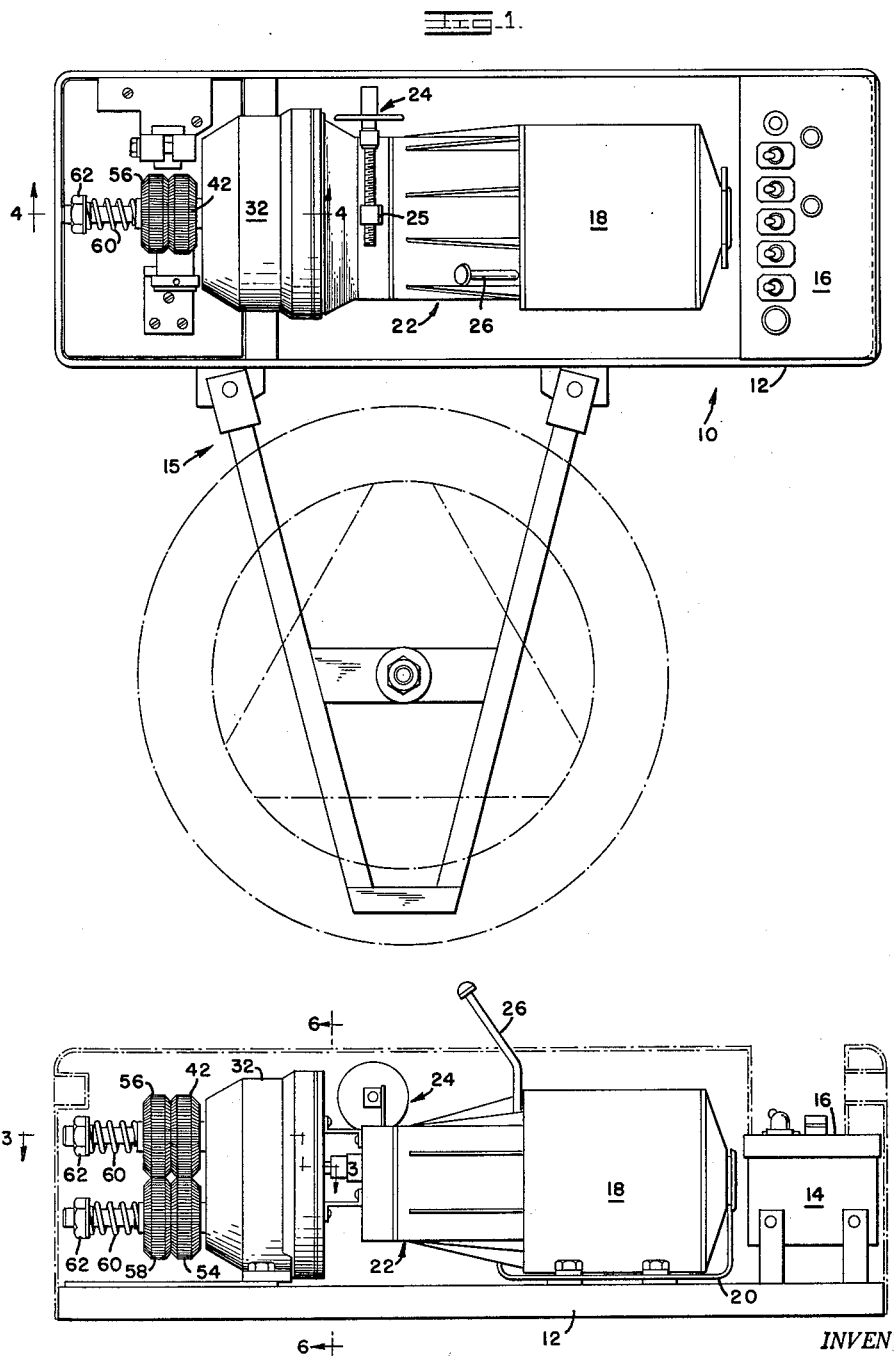

June 11, 1963  R. R. LEAMING ET AL  3,093,285
ELECTRODE FEEDING MECHANISM FOR WELDING APPARATUS
Filed April 28, 1959  3 Sheets-Sheet 3
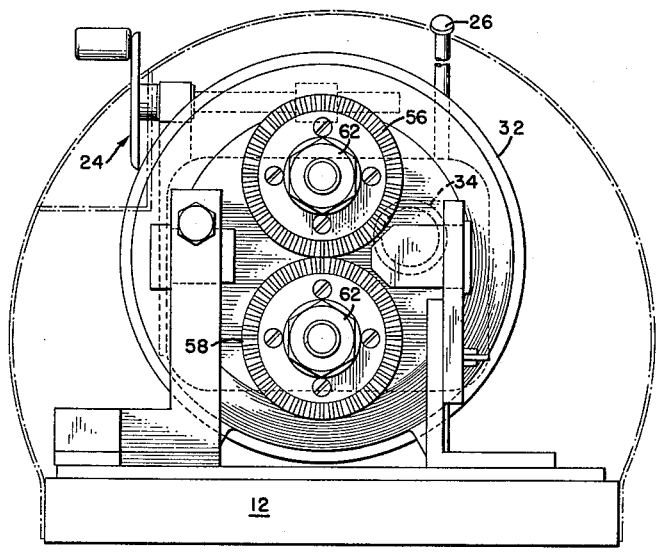
Fig. 5.
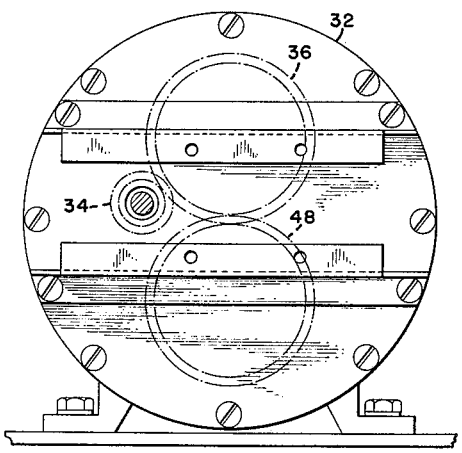
Fig. 6.
Fig. 7.
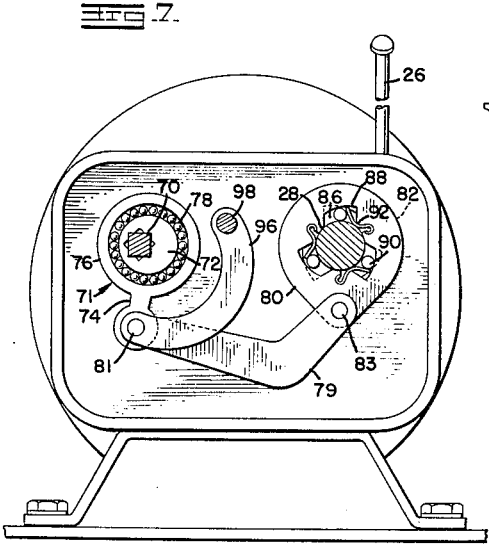
INVENTORS
ROBERT R. LEAMING
WILLIAM W. COFFEEN
BY
Robert C. Sullivan
ATTORNEY

United States Patent Office 3,093,285
Patented June 11, 1963

3,093,285
ELECTRODE FEEDING MECHANISM FOR
WELDING APPARATUS
Robert R. Leaming, Rahway, and William W. Coffeen,
Westfield, N.J., assignors, by mesne assignments, to
M & T Chemicals Inc., New York, N.Y., a corporation
of Delaware
Filed Apr. 28, 1959, Ser. No. 809,454
2 Claims. (Cl. 226—184)

This invention relates to electrical welding and more particularly to an improved apparatus for feeding a welding wire or rod to the work during a welding operation. The apparatus of the invention may be used for wire feeding in either automatic or semi-automatic arc welding machines.

During a welding operation in which a welding wire or rod is fed to the work, it is frequently desirable or necessary to vary the speed of feeding of the wire, different rates of speed being required for different operating conditions and for different rates of electrode consumpton. It is also desirable that the feeding force applied to the welding wire, as determined by the torque of the wire feed rolls, be maintained constant despite variations in speed of the feed rolls. It is also sometimes necessary or desirable to reverse the direction of movement of the welding wire, moving it away from the work, as in striking an arc, for example.

In automatic welding equipment including a carriage which traverses a fixed path and which carries the wire feed rolls, it is the usual practice to "inch" the welding wire down toward the work, with the wire deenergized or "cold," and with the end point of the inching operation being dependent upon the means used for initiating the arc, such as scratch start, steel wool, high frequency, etc. In cold inching of the welding wire or electrode in this type of application, it frequently happens that the position of the electrode relative to the work is critical, requiring extremely slow inching. While various types of wire feeding apparatus are known in which the speed of the wire feed can be varied as a function of the arc conditions, with the electrode energized or "hot," most wire feeding units now available have no means of critically adjusting the speed of the wire feeding with the electrode deenergized or "cold," while others merely have provision for two different inching speeds, such as "fast" or "slow."

Another problem in connection with the welding operations which is not usually conveniently provided for in available welding equipment is provision for "burning back" of the welding wire at the completion of the weld, which requires that movement of the welding wire be arrested, but that the welding wire continue to remain energized or "hot."

Still another problem of many wire feeding devices for welding apparatus is the problem of preventing override of the welding wire when the wire feeding device is cut off. In most wire feeding devices of the prior art, dynamic braking must be provided to prevent override of the welding wire.

Accordingly, it is an object of this invention to provide a wire or rod feeding device for use with either automatic or semi-automatic welding apparatus in which the speed of the feed rolls and consequently of the feeding of the wire may be varied over a wide range.

It is a further object of this invention to provide a wire or rod feeding device for welding apparatus having wire feed rolls which are driven at a constant output torque over a wide speed range.

Still a further object of this invention is to provide a wire or rod feeding device for welding apparatus having wire feed rolls whose speed may be varied over a wide range by purely mechanical means in contrast to variation in electrical motor speed sometimes used in the prior art to accomplish change in rate of wire feed.

It is another object of this invention to provide a wire or rod feeding device for welding apparatus which provides means for mechanically reversing the direction of rotation of the wire feed rolls.

Still another object of the invention is to provide a wire or rod feeding apparatus which permits bringing the welding wire or rod to a dead stop without the necessity of dynamic braking to avoid override of the welding wire.

Another object of the invention is to provide a wire feeding apparatus which permits extremely slow inching movements of the welding wire in applications where the position of the electrode relative to the base plate is critical.

In achievement of these objectives, there is provided in accordance with an embodiment of this invention a welding wire or rod feeding apparatus driven by an electric motor and including a steplessly variable speed transmission interposed between the output shaft of the electric motor and the wire feed rolls. The output speed of the variable speed transmission is infinitely variable from zero to a maximum value, while maintaining constant torque on the wire feed rolls. The variable speed transmission includes a plurality of crank arms eccentrically mounted on the input shaft driven by the electric motor and connected to a plurality of one-way friction clutch elements mounted on the output shaft of the variable speed transmission which drives the wire feed rolls. When the clutch elements are rocked in one direction by the eccentrically mounted crank members, they have a wedging engagement with rollers interposed between the clutch elements and the output shaft which causes the output shaft to move with the clutch elements. When the friction clutch elements are rocked in the opposite direction, the roller members move out of wedged relation so that no driving motion is transmitted by the clutch elements to the output shaft of the transmission. Means are provided for adjusting the throw of the eccentrically mounted crank members to thereby vary the movement imparted by the clutch elements to the output shaft of the transmission, hence varying the output speed of the transmission. Means are also provided for reversing the direction of rotation of the output shaft by providing two sets of clutch elements having wedge surfaces extending in opposite directions, and selectively controlling which clutch elements are engaged by the wedging rollers. The reversing means can be moved to a neutral position in which neither of the sets of clutch elements engage the wedging rollers, in which case the variable speed transmission has zero output speed, although its input shaft continues to be driven.

Further objects and advantages of the invention will become apparent from the following description taken in conjunction with the accompanying drawings in which:

FIG. 1 is a top plan view of a wire feeding apparatus in accordance with the invention;

FIG. 2 is a side elevation view of the wire feeding apparatus of FIG. 1;

FIG. 5 is an end view of the wire feeding apparatus looking in at the left end of FIG. 1;

FIG. 6 is a view in vertical section taken along line 6—6 of FIG. 2; and

FIG. 7 is a partially diagrammatic view in vertical section of the variable speed transmission.

Figure 3:
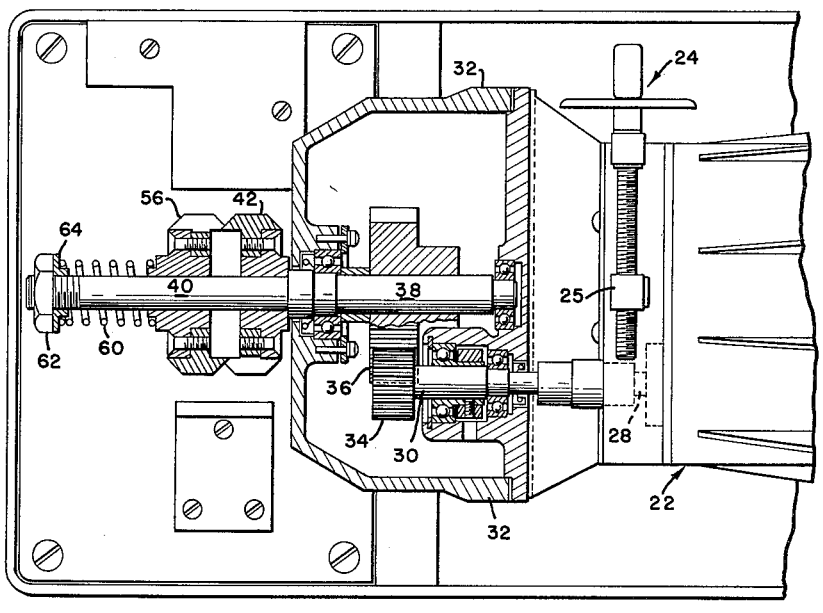
FIG. 3 is a view in horizontal section of the feed rolls and speed reduction gear housing taken substantially along section line 3—3 of FIG. 2.

Referring now to the drawings, there is shown a welding wire or rod feeding apparatus generally indicated at 10 mounted upon a base member 12 and including an electrical control box 14 having a control panel 16 on which are mounted the various control switches and the like for controlling the electrical operation of the wire feeding apparatus. A bracket assembly generally indicated at 15 is attached to base member 12 and provides a support for a reel of the welding wire which is fed by the wire feeding apparatus.

An electric drive motor 18 is supported on base 12 by bracket 20 and the output shaft of electric motor 18 is connected in direct driving relation to the input shaft of variable speed transmission generally indicated at 22 having a speed control adjusting screw 24 and a reversing lever 26 which reverses the direction of the output shaft of the variable speed transmission although the direction of rotation of the motor and of the input shaft to the variable speed transmission remains constant, as will be explained in more detail hereinafter.

Output shaft 28 of variable speed transmission 22 is suitably coupled to input shaft 30 of a pinion gear 34 which is disposed within a gear housing generally indicated at 32. Shaft 30 of pinion gear 34 is suitably journalled for rotation by bearings in gear housing 32. Pinion gear 34 engages a spur gear 36 of substantially larger diameter in driving relation. Gear 36 is keyed to a shaft 38 suitably supported by bearings in the opposite end walls of gear housing 32. Shaft 38 is suitably coupled to a shaft 40 which is aligned with shaft 38 but disposed outside of gear housing 32. One of the driving rollers 42 of the wire feed rolls is suitably attached by screws 44 to a hub 46 which is keyed to shaft 40 driven by shaft 38.

Spur gear 36 driven by pinion 34 mates with a similar spur gear 48 of the same diameter as gear 36 and also disposed within gear housing 32. Thus, pinion gear 34 drives both spur gears 36 and 48. The diameters of spur gears 36 and 48 relative to pinion gear 34 is such as to obtain a desired speed reduction from the output shaft of variable speed transmission to the wire feed rolls. Spur gear 48 is keyed to a shaft 50 whose axis is parallel to the axis of shaft 38 of gear 36, shaft 50 being suitably supported for rotation by bearings in the opposite end walls of gear housing 32. Shaft 50 of spur gear 48 is coupled to a shaft 52 disposed outside of gear housing 32. A second drive feed roll 54 is rigidly mounted on shaft 52 in the same manner as drive roll 42 is attached to shaft 40.

On each of the respective shafts 40 and 52 which carry the drive feed rolls 42 and 54, mating wire feed rolls 56 and 58 are respectively mounted for sliding movement into intermeshing engagement with drive rolls 42 and 54. A compression spring such as that indicated at 60 is carried by each of the shafts 40 and 52 and urges one of the respective slidably movable feed rolls 56 or 58 into engagement with one of the respective drive feed rolls 42 or 54 on its respective shaft 40 or 52. The compression on springs 60 is adjusted by lock nuts 62 which can be adjusted to move the spring retainer 64 against which one end of each spring 60 bears. The welding wire is frictionally engaged by the four feed rolls 42, 54, 56, 58 in the region indicated at 66 in FIG. 4.

Referring now in more detail to the variable speed power transmission, reference is made to FIG. 7 of the drawings. The variable speed power transmission in the embodiment disclosed is similar to that shown in United States Patent 2,691,896, issued on October 19, 1954, to Sterling O. Stageberg. The transmission 22 includes an input shaft 70 which is suitably coupled to the output shaft of electric motor 18, and an output shaft 28, previously mentioned, which drives pinion 34 of the speed reduction gearing inside gear housing 32. Input shaft 70 of the variable speed transmission has mounted thereon and axially spaced at intervals a plurality of crank members generally indicated at 71 and each surrounding an eccentric disc 72 rigidly mounted on and rotatable with shaft 70. Each crank member 71 includes a circular strap member 76 having a connecting rod 74 integral therewith, each circular strap member surrounding its corresponding eccentric disc 72 and radially spaced therefrom by ball bearings 78. Although only one crank member 71 is shown in FIG. 7, a plurality of such crank members are provided, the position of the eccentric discs 72 of the respective crank members being progressively rotated on input shaft 70. For example, if four crank members 71 are provided, the eccentric disc portions 72 of the respective cranks are rotated 90 degrees from each other on shaft 70.

The variable speed power transmission also includes a pair of clutch elements 80 and 82, respectively, corresponding to each crank member 71, and surrounding driven shaft 28. Each of the clutch elements 80 and 82 includes a plurality of circumferentially spaced openings or pockets 86 each having a spiralling cam edge 88 of decreasing radial distance from the periphery of driven shaft 28. Each of the spiralling cam edges 88 of the pockets 86 on a given clutch element 80 or 82 spirals in the same direction. However, the cam edges 88 of the pockets 86 on clutch elements 80 spiral radially inwardly in an opposite direction from the corresponding cam edges shown in dotted line in FIG. 7 on clutch elements 82. A roller member 90 is disposed in each of the pockets 86 of clutch elements 80 and 82, the same roller being received in corresponding pockets of both clutch elements 80 and 82 corresponding to a given crank member 71. A spring member 92 may be used to bias roller member 90 into engagement with the outer peripheral surface of driven shaft 28. A connecting link 79 is pivoted at one of its ends at point 81 to the radially outer end of connecting rod 74, the opposite end of link 79 being pivotally connected at point 83 to clutch elements 80 and 82. Thus, the eccentric movement of cranks 71, caused by rotation of input shaft 70, moves link 79 to produce a rocking movement of clutch elements 80 and 82 on driven shaft 28, the degree of rocking movement being controlled by controlling the position of connecting rods 74, as will be explained hereinafter.

Due to the spiral configuration of cam edges 88 of clutch elements 80 and 82, clutch element 80 becomes in wedged engagement with rollers 90 upon clockwise rocking movement of clutch element 80, assuming that clutch element 80 is in a position where it is engageable with rollers 90, while clutch element 82 becomes in wedged engagement with rollers 90 upon counterclockwise rocking movement of clutch elements 82, again assuming that clutch elements 82 are in a position where they engage rollers 90.

In order to control whether clutch elements 80 or clutch elements 82 engage rollers 90, and thereby control the direction of rotation of output shaft 28, lever member 26 which projects above the vairable speed transmission housing 22 suitably engages the plurality of clutch elements 80 and 82 within housing 22. Movement of lever 26 is effective to axially shift clutch elements 80 and 82 relative to rollers 90 so that in one adjusted position of lever member 26, rollers 90 cooperate with clutch elements 80 while in another adjusted position of lever member 26, rollers 90 cooperate with clutch elements 80 while in another adjusted position of lever member 26, rollers 90 cooperate with clutch elements 82. In a third adjusted position, or neutral position of lever arm 26, neither clutch elements 80 nor 82 are operatively engaged with rollers 90. In the neutral position of lever member 26, output shaft 28 of the variable speed transmission does not turn, although input shaft 70 of the transmission is turning.

The amount of rotary movement of transmission output shaft 28 produced for any given rotation of input shaft 70 depends upon the amount of lateral movement or throw of crank members 71 during the movement of eccentric discs 72, and this is controlled by the speed control link 96 which is pivoted to the connecting rod 74 and to the control link 79 at point 81. A speed control link 96 is provided for each crank member 71, and the plurality of control links 96 are connected together by a rod 98 so that all of the speed control links 96 move in unison.

When connecting rods 74 are shifted by speed control link 96 to a vertical position, connecting rods 74 and connecting links 79 move up and down vertically and do not have any component of back-and-forth or lateral motion. In this position of connecting rods 74, no motion is transmitted to the clutch elements 80 and 82 and speed of output shaft 28 is zero. By moving speed control link 96, connecting rods 74 can be tilted away from a vertical position so that they have a component of lateral or back-and-forth motion for each rotation of transmission drive shaft 70. The degree of tilting of connecting rods 74 can be varied to control the speed of transmission output shaft 28.

In order to provide a fine adjustment of the position of the plurality of speed control links 96 and hence of the speed of transmission output shaft 28, an adjusting screw device 24 is provided. Rotation of screw 24 is effective to provide a linear movement of nut 25 which, in turn, is suitably connected to the plurality of speed control links 96 to vary the position of links 96, in the manner shown in United States Patent 2,691,896 issued on October 19, 1954, to Sterling O. Stageberg.

Figure 4:
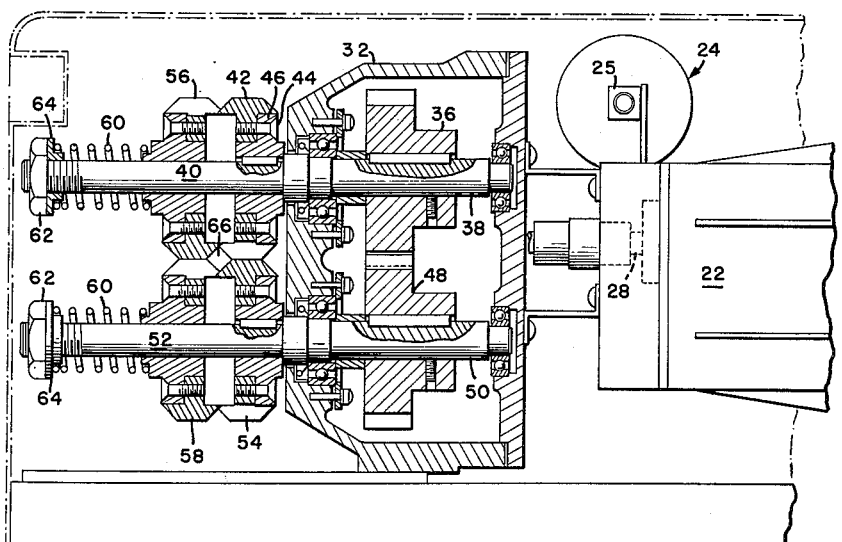
FIG. 4 is a view in vertical section taken along line 4—4 of FIG. 1.

In using the wire feeding apparatus of the invention, the reel of welding wire is positioned on bracket 15 and the wire is positioned between the feed rolls 42, 54, 56, and 58 as indicated at 66 in FIG. 4. The wire feeding device may be used either in conjunction with automatic welding apparatus in which a carriage traverses a fixed path, or may be used in connection with semi-automatic welding equipment in which a welding gun is manually held by an operator.

The rate of feed of the welding wire, whether used in connection with automatic or semi-automatic equipment, may be varied to meet the particular requirements of the situation by suitable adjustment of the screw adjusting means 24 of the variable speed transmission 22 to thereby adjust the speed of the output shaft 28 of the variable speed transmission device. The output speed of the variable speed transmission device may be infinitely varied over a wide range. This speed adjustment is of particular value in connection with cold inching of the electrode wire in automatic operation, where the position of the electrode relative to the work often must be critically adjusted by extremely slow inching. If desired, the reversing lever of the variable speed transmission may be operated to reverse the direction of rotation at the output shaft of the transmission to thereby move the welding wire away from the work, as may be required, for example, in striking an arc.

The combination with the wire feed apparatus of the variable speed transmission hereinbefore described has the further advantage that constant torque is maintained on the wire feed rolls at all times despite variations in the output speed of the variable speed transmission, thereby maintaining a constant feeding force on the welding wire.

The use of the wire feed device of the invention also permits the welding wire to be "burned back" at the completion of the weld. This is accomplished by placing the reversing lever 26 in neutral position, which results in zero speed at the output shaft 28 of the variable speed transmission, although the input shaft 70 continues to be driven by the electric motor 18, and the welding wire or electrode continues to remain energized.

A further advantage of the wire feeding apparatus of the invention is that it permits the welding wire to be brought to a dead stop when the electric motor or other drive means for the apparatus is deenergized, thereby preventing override of the welding wire. This eliminates the requirement for dynamic braking, frequently required in wire feeding devices of the prior art.

The combination with the wire feed apparatus of the variable speed transmission hereinbefore described has the further advantages that the speed control and speed variation may be entirely mechanical, without special electrical circuitry being required, and that the use of a special driving motor or other special drive means for driving the variable speed transmission is not required. This latter advantage makes possible the use of standard frame motors which may be easily interchanged in the field.

While the speed variation of the wire feed made possible by the apparatus of the invention may be accomplished strictly by mechanical means without use of special electrical controls or circuitry for speed control, the electric drive motor for the variable speed transmission can also be driven as a function of the arc voltage if desired.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What is claimed as the invention is:

1. An electrode feeding mechanism for welding apparatus comprising, in combination, a constant speed power drive means having a rotary output shaft, a variable speed power transmission having a rotary input shaft and a rotary output shaft, means connecting said output shaft of said constant speed power drive means in driving relation to said input shaft of said power transmission to drive said input shaft at constant speed, one-way friction clutch means mounted for rocking movement on said output shaft of said power transmission whereby rocking movement of said friction clutch means in one direction is effective to impart motion to said output shaft of said power transmission, while rocking movement of said friction clutch means in the opposite direction is ineffective to impart rotary motion to said output shaft of said power transmission, means connecting said input shaft of said power transmission to said friction clutch means whereby rotation of said input shaft imparts rocking movement to said friction clutch means, means for adjusting the degree of rocking movement of said friction clutch means for a given rotation of said input shaft to thereby vary the movement of said output shaft of said power transmission for a given rotation of said input shaft, and electrode feed rolls driven by said output shaft and engageable with the welding electrode to impart movement thereto.

2. An electrode feeding mechanism for welding apparatus comprising, in combination, a constant speed power drive means having a rotary output shaft, a variable speed power transmission having a rotary input shaft and a rotary output shaft, means connecting said output shaft of said constant speed power drive means in driving relation to said input shaft of said power transmission to drive said input shaft at constant speed, eccentrically mounted crank means carried by said input shaft of said power transmission, one-way friction clutch means mounted for rocking movement on said output shaft of said power transmission whereby rocking movement of said friction clutch means in one direction is effective to impart motion to said output shaft of said power transmission, while rocking movement of said friction clutch means in the opposite direction is ineffective to impart rotary motion to said output shaft of said power transmission, link means connecting said crank means to said friction clutch means to impart rocking movement to said friction clutch means, means for adjusting the lateral throw of said crank means to control the degree of rocking movement of said friction clutch means to thereby vary the movement of said output shaft of said power transmission for a given rotation of said input shaft, and electrode feed rolls driven by said output shaft of said variable speed transmission and engageable with the welding electrode to impart movement thereto.

(References on following page)

References Cited in the file of this patent

UNITED STATES PATENTS

| | | |
|---|---|---|
| 599,545 | Altham | Feb. 22, 1898 |
| 632,591 | Simpson | Sept. 5, 1899 |
| 1,201,125 | Weeks | Oct. 10, 1916 |
| 1,513,021 | Allen | Oct. 28, 1924 |
| 2,069,623 | Pickhaver et al. | Feb. 2, 1937 |
| 2,311,903 | Wilcox | Feb. 23, 1943 |
| 2,691,896 | Stageberg | Oct. 19, 1954 |
| 2,750,818 | Byam | June 19, 1956 |
| 2,906,913 | Catlett | Sept. 29, 1959 |